(12) United States Patent
Ghosh et al.

(10) Patent No.: US 7,949,067 B2
(45) Date of Patent: May 24, 2011

(54) INDIVIDUAL INTERLEAVING OF DATA STREAMS FOR MIMO TRANSMISSION

(75) Inventors: Monisha Ghosh, Chappaqua, NY (US); Pen Li, San Jose, CA (US)

(73) Assignee: NXP B.V., Eindhoven (NL)

( * ) Notice: Subject to any disclaimer, the term of this patent is extended or adjusted under 35 U.S.C. 154(b) by 327 days.

(21) Appl. No.: 11/916,513

(22) PCT Filed: Jun. 23, 2006

(86) PCT No.: PCT/IB2006/052066
§ 371 (c)(1),
(2), (4) Date: Oct. 24, 2008

(87) PCT Pub. No.: WO2007/091131
PCT Pub. Date: Aug. 16, 2007

(65) Prior Publication Data
US 2009/0074091 A1    Mar. 19, 2009

Related U.S. Application Data

(60) Provisional application No. 60/724,133, filed on Oct. 5, 2005.

(51) Int. Cl.
*H04L 27/00* (2006.01)
(52) U.S. Cl. ........ 375/295; 375/260; 375/267; 375/347; 370/203; 370/208

(58) Field of Classification Search .................. 375/260, 375/267, 295, 347; 370/203–211
See application file for complete search history.

(56) References Cited

U.S. PATENT DOCUMENTS

| | | | |
|---|---|---|---|
| 6,807,145 | B1 | 10/2004 | Weerackody et al. |
| 2003/0235149 | A1 | 12/2003 | Chan et al. |
| 2004/0081131 | A1 | 4/2004 | Walton et al. |
| 2006/0008031 | A1 * | 1/2006 | Vummintala et al. ......... 375/299 |

* cited by examiner

*Primary Examiner* — Curtis B Odom

(57) ABSTRACT

The present invention, generally speaking, provides interleavers and methods of interleaving that satisfy the need for backward compatibility while effectively addressing competing design objectives. In accordance with one aspect of the invention, data is transmitted using a number of transmit antennas greater than an expected number of receive antennas. At least one pair of transmit antennas is formed (ant1, ant_N), and multiple second data streams (311, 312) are formed from a first data stream, successive bits in said first data stream being assigned to different ones of said second data streams. Block interleaving (313, 314) of multiple respective ones of said second data streams is individually performed. During successive transmission intervals, the pair of transmit antennas is used to transmit a pair of data symbols taken from different ones of said second data streams, followed by an equivalent transformed pair of data symbols.

9 Claims, 4 Drawing Sheets

INDIVIDUAL INTERLEAVING OF DATA STREAMS FOR MIMO TRANSMISSION

BACKGROUND OF THE INVENTION

1. Field of the Invention

The present invention relates to wireless digital communications.

2. Description of Related Art

A block diagram of a typical 802.11a/g transmitter is shown in FIG. 1. Such a transmitter is a Single-Input-Single-Output (SISO) system. Bits to be transmitted are applied to a forward error correction (FEC) encoder 101, followed by a interleaver 103. Output bits of the interleaver 103 are grouped and mapped within the signal plane by a symbol mapper 105 (e.g., a QAM mapper) to form symbols. An IFFT operation 107 then follows in which symbols are mapped to a series of subcarrier frequencies (i.e., frequency bins) and transformed to obtain a series of time samples. A cyclic extension operation 107 (equivalent to adding guard symbols) is performed to obtain a resulting OFDM symbol. Pulse shaping 109 and IQ modulation 111 are then performed to obtain an RF output signal 113.

A typical 802.11a/g system has a block interleaver (e.g., block interleaver 103) that may be described in terms of a first permutation followed by a second permutation using the following parameters:

N_CBPS is the size of the interleaver, i.e., the number of coded bits per symbol k is the index of the input bits i is the index after the first permutation j is the index after the second permutation The first and second permutations are as follows:

$$i=(N\_CBPS/16)(k \bmod 16)+\mathrm{floor}(k/16), k=0, 1, \ldots, N\_CBPS-1 \quad \text{1st permutation}$$

there are 16 columns and N_CBPS/16 rows
bits are written row by row and are read column by column $$j=s*\mathrm{floor}(i/s)+(i+N\_CBPS-\mathrm{floor}(16*i/N\_CBPS)) \bmod s, i=0, 1, \ldots, N\_CBPS-1 \quad \text{2nd permutation}$$

where s=max(N_BPSC/2, 1), N_CBPS is the number of bits per symbol in the OFDM subcarrier. For different columns, the bit significance index is changed so that the adjacent bits are not always mapped to the same index in any symbol.

The foregoing permutations are represented by blocks 201 and 203 in FIG. 2

Following the strong market success of 802.11a/b/g wireless networking, an 802.11n working group was formed in 2003, chartered to create a standard for high-throughput wireless LAN. In this proposed standard, the maximum data rate can go as high as 720 Mbps with more than twice the range as compared to 802.11a/b/g. The fundamental technology is called Multiple-Input-Multiple-Output (MIMO), which essentially uses multiple antennas to exploit path diversity in the wireless medium. When discussing a MIMO system, M×N means M transmit antennas and N receive antennas.

Multiple antennas makes possible a type of coding referred to as Space Time Block Coding (STBC), an example of which is Alamouti coding. In STBC, a block of information is encoded and transmitted over multiple antennas (space) and over multiple symbol periods (time).

It is desirable that 802.11n (MIMO) systems be backwardly compatible with at least 802.11a/g (SISO) systems. With respect to interleaving in particular, a need exists for interleaving arrangements that achieve backward compatibility while addressing competing design objectives (e.g., compactness, low power consumption, and robustness of communications).

BRIEF SUMMARY OF THE INVENTION

The present invention, generally speaking, provides interleavers and methods of interleaving that satisfy the need for backward compatibility while effectively addressing competing design objectives. In accordance with one aspect of the invention, data is transmitted using a number of transmit antennas greater than an expected number of receive antennas. At least one pair of transmit antennas is formed, and multiple second data streams are formed from a first data stream, successive bits in said first data stream being assigned to different ones of said second data streams. Block interleaving of multiple respective ones of said second data streams is individually performed. During successive transmission intervals, the pair of transmit antennas is used to transmit a pair of data symbols taken from different ones of said second data streams, followed by an equivalent transformed pair of data symbols. In accordance with another aspect of the invention, data is transmitted using either a single antenna or multiple antennas. When transmitting data using a single antenna, block interleaving of data is performed using a first interleaving method prior to transmission; when transmitting data using multiple antennas, multiple second data streams are formed from a first data stream, successive bits in said first data stream being assigned to different ones of said second data streams. Block interleaving of multiple ones of said second data streams is performed using an interleaving method substantially the same as said first interleaving method. [OPERATION C]. In accordance with another aspect of the invention data is transmitted using a number of transmit antennas greater than an expected number of receive antennas. A group of transmit antennas is formed, and multiple second data streams are formed from a first data stream, including a second data stream for each of the antennas, successive bits in said first data stream being assigned to different ones of the second data streams. Block interleaving of multiple respective ones of said second data streams is individually performed. During successive transmission intervals, respective nonzero symbols are output in turn for transmission from different ones of said antennas such that during a given transmission interval a non-zero symbol is assigned to just one antenna of the group of antennas and zero symbols are assigned to other antennas of the group of antennas.

BRIEF DESCRIPTION OF THE DRAWING

The present invention may be further understood from the following description in conjunction with the appended drawing. In the drawing.

DETAILED DESCRIPTION OF THE INVENTION

In the following description, the case of two transmit antennas is shown as being exemplary of the more general case of N transmit antennas. The principles of the present invention may readily be extended from two antennas to more than two antennas as will be appreciated by those of ordinary skill in the art.

For 802.11n, multiple spatial streams are required. Since for an 802.11n system to be backward compatible with an 802.11a/g system, the 802.11a/g interleaver has to be present. The present approach is to create new interleavers based on the 802.11a/g interleaver. That is, the input bits are parsed to two streams, and on each stream an 802.11a/g interleaver is used.

Figure 1:
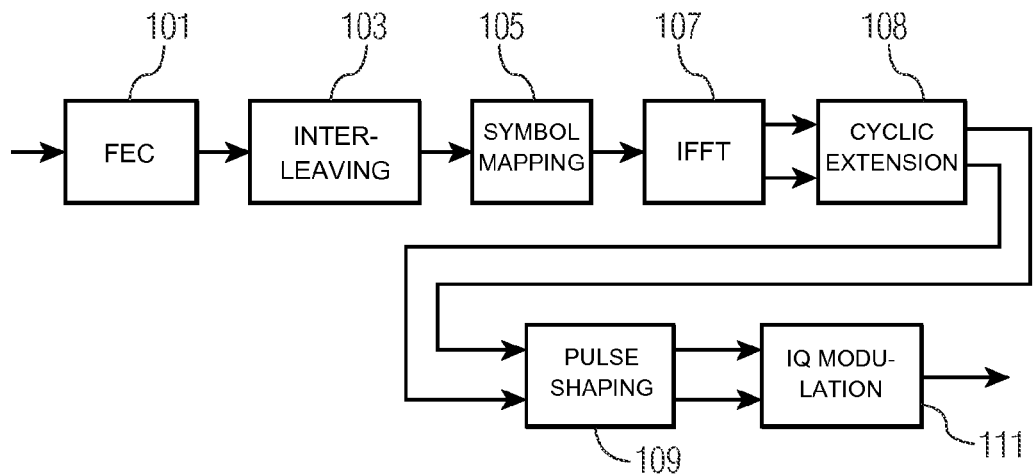
FIG. 1 is a block diagram of a known SISO communication transmitter.
Figure 2:
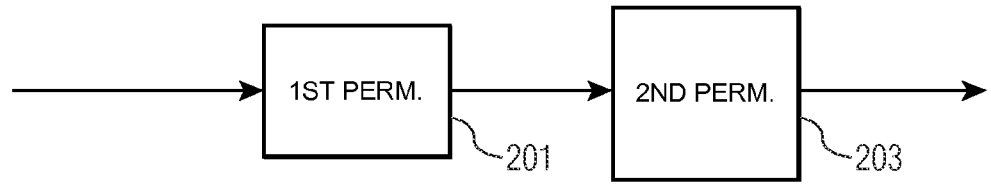
FIG. 2 is a more detailed block diagram of the interleaver of FIG. 1.
Figure 3:
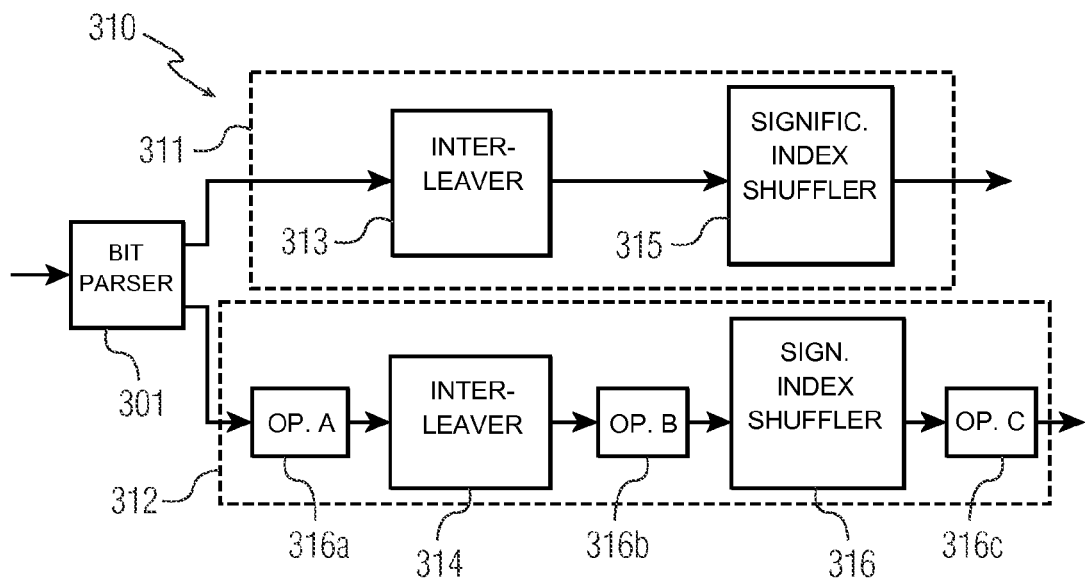
FIG. 3 is a block diagram of a portion of a MIMO communication transmitter.

Referring now to FIG. 3, a block diagram is shown of a MIMO communication transmitter. A single information stream is applied to a bit parser 301. Depending on the transmission mode, the bit parser produces a single information stream or two separate information streams. In SISO mode, the bit parser steers the incoming information stream to an upper branch 311 of an interleaver 310. The upper branch of the interleaver may have the same construction as the interleaver of FIG. 2. That is, a block interleaver operation 313 is followed by a significance index shuffler 315. In MIMO mode, the bit parser outputs alternate bits of the incoming information stream to alternate ones of the upper branch 311 of the interleaver and a lower branch 312 of the interleaver, producing two separate information streams.

The lower branch of the interleaver preferably includes corresponding blocks 314 and 316 as the upper branch of the interleaver. In addition, the lower branch of the interleaver includes a block 316c (Operation C) and may optionally include a block 316b (Operation B) or a block 316a (Operation A).

It is desirable to separate adjacent bits, now in different spatial streams, as apart as possible in the frequency domain. One simple way of doing it is to cyclically rotate the output of block 316 in the multiples of N_CBPS (Operation C). Operation C may be imagined in terms of buffering the interleaved block in a linear buffer and performing cyclic rotation by a multiple of N_CBPS. Using a realistic system model, it may be shown that for a 2×2, 40 MHz system, cyclically rotating 57*N_CBPS, i.e. cyclically rotating 57 frequency tones in OFDM, would generate the lowest PER (Packet Error Rate) for a given SNR. For a 2×2, 20 MHz system, a suitable rotation is 25*N_CBPS. Note that in Operation C the bit significance index has not been changed.

It is desirable also to change the bit significance index as between the two streams. There are many ways to do so. One way is to change Operation 2 (block 316), for example by changing the definition of s in the second permutation above. Alternatively, since the current permutation changes according to the column index, changing the bit significance index may be achieved by performing the permutation according to a different column index, say column index+1.

To avoid modifying Operation 2 (in view of hardware reuse considerations, for example), an equivalent effect can be achieved at various locations within the circuit, e.g., at Bit Parser 301 or Operation A or Operation B. One simple way of implementing Operation B, for example, is to cyclically rotate bits belonging to a symbol of the second bit stream, say by 1. In the case of a third bit stream, bits belonging to a symbol would be cyclically rotated by 2, etc.

Operation A may take the form of another interleaver, for example, designed so as to achieve distinct significance index shuffling. It is also potentially possible to combine Operation A with the Bit Parsing block 301.

Distinct significance index shuffling can also be done as part of Operation C (i.e., on top of what has already been done to achieve frequency separation). A simple way to do so is to shift one more bit in the second bit stream, two more bits in the third bit stream, etc.

When transmit antennas outnumber receive antennas in a MIMO-OFDM system, the number of data streams must be fewer than the number of transmit antennas. However, it is known that the additional transmit antenna(s) can provide added spatial diversity and thus further improve the system performance. One way of doing so is to use spatial spreading, which uses the signal cyclic-delayed from the other antenna's signal.

Figure 4:
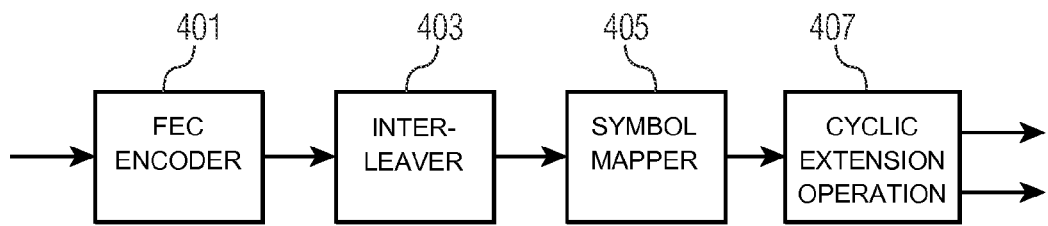
FIG. 4 is a block diagram of a portion of a communication transmitter using tone-interleaved signals for two antennas.

Another other way of doing so is to use tone-interleaved signals for two antennas as shown in FIG. 4. In FIG. 4, blocks 401, 403 and 405 correspond generally to blocks 101, 103 and 105. Block 407 performs tone interleaving in the following manner:

In the frequency domain,
ant1=[a1, 0, a3, 0, . . . ]
ant2=[0, a2, 0, a4, . . . ]

That is, a pair of antennas is formed and during a particular symbol period, half of the tones within an OFDM symbol transmitted via one antenna of the antenna pair are used and half of the tones are unused. In the case of the other antenna, the use or non-use of a particular tone is reversed. This simple tone interleaving does not fully exploit the frequency diversities in the OFDM signal as the result of the simple alternating scheme.

Figure 5:
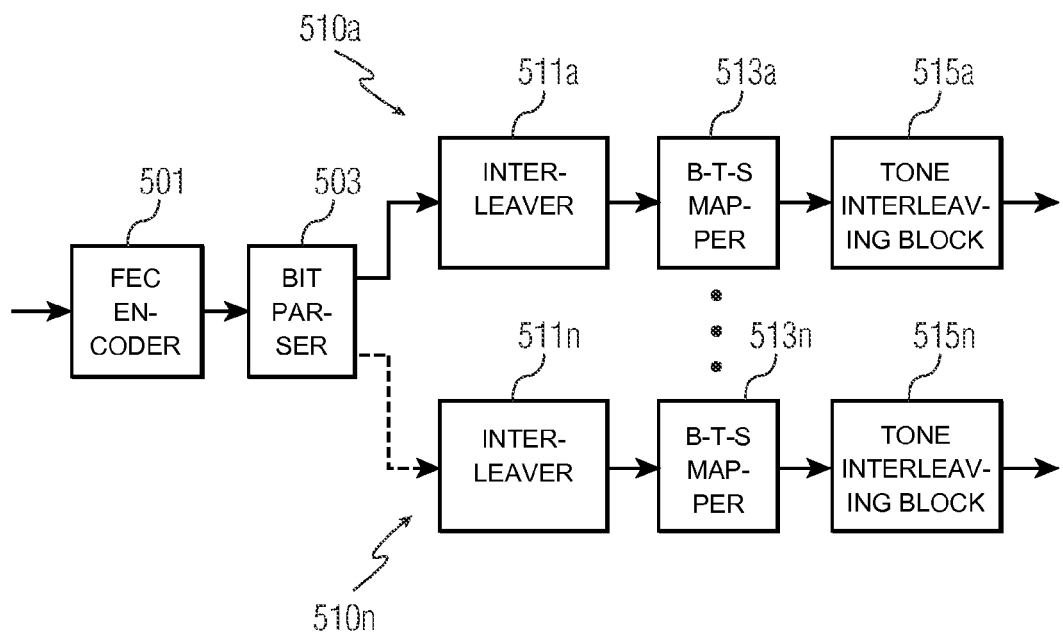
FIG. 5 is a block diagram of a portion of a communication transmitter using tone-interleaved signals for two antennas in accordance with one aspect of the present invention.

Referring to FIG. 5, it is assumed that there are N antennas but only one stream is allowed. A single information stream is applied to an FEC encoder 501 followed by a bit parser 503. The bit parser outputs bits of the incoming information stream in turn to different ones of the branches 510a, . . . , 510n. Each branch includes an interleaver 511 followed by a bit-to-symbol mapper 513 and a tone interleaving block 515. Frequency diversity is exploited as follows:
ant_1=[a1, 0, . . . 0, a_N+1, 0, . . . ]
ant_2=[0, a2, 0, . . . , a_N+2, 0, . . . ]
. . .
ant_N=[0, . . . , 0, a_N−1, 0, a_N+N, 0, . . . ]

Interleaver depth can be adjusted to meet latency requirements.

Figure 6:
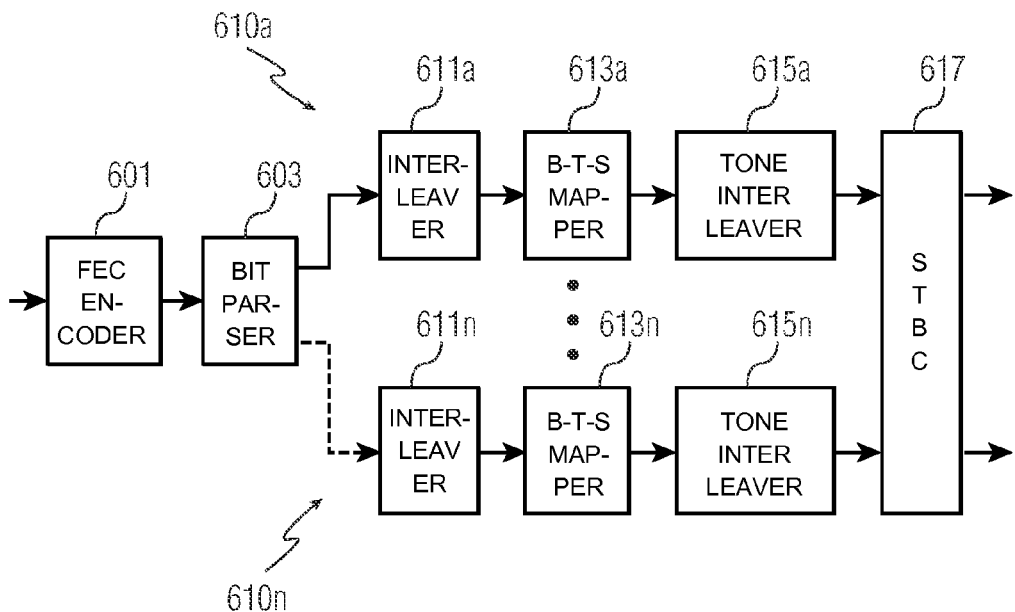
FIG. 6 is a block diagram of a portion of a communication transmitter using tone-interleaved signals for two antennas in accordance with another aspect of the present invention.

Referring to FIG. 6, the same structure can be applied to STBC, with STBC (block 617) being applied after tone interleaving.

Figure 7:
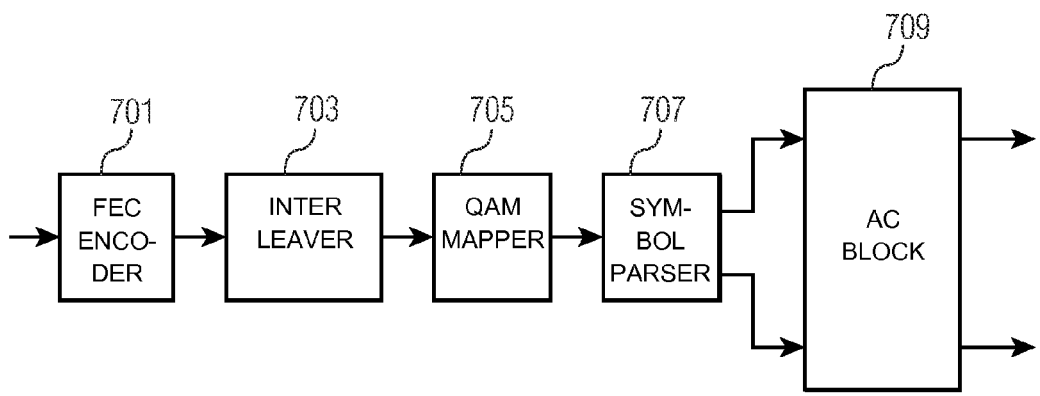
FIG. 7 is a block diagram of a portion of a communication transmitter using Alamouti coding.

For a 2×1 system, a particular variant of STBC is Alamouti coding. Alamouti coding maps two adjacent symbols to two transmit antennas for simultaneous transmission. To take full advantages of Alamouti Coding (AC), an interleaver is usually utilized before AC. Referring to FIG. 7, data to be transmitted is applied to an FEC encoder 701, followed in turn by an interleaver 703, a QAM mapper 705 and a symbol parser 707. The symbol parser produces multiple symbol streams, which are applied to a AC block 709.

Figure 8:
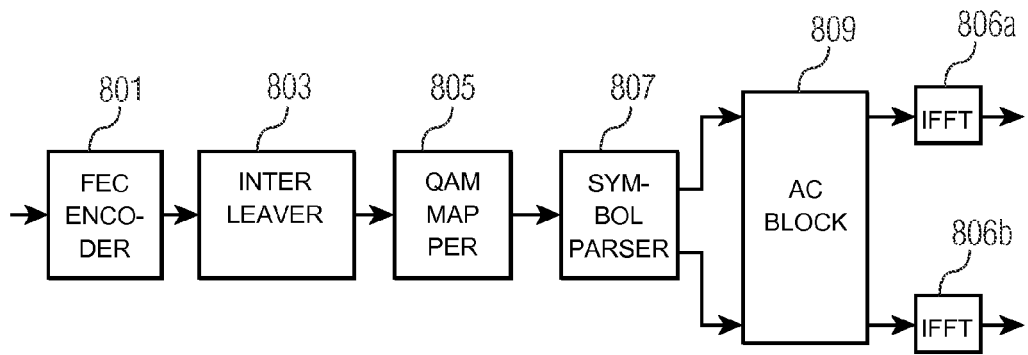
FIG. 8 is a block diagram of a portion of communication transmitter using OFDM and Alamouti coding.

In an OFDM system, as illustrated in FIG. 8, for each branch an RFFT 806 is added following the AC block 809.

For 4×1 system, Alamouti Coding is generalized to 4×1 Space-Time Block Code (STBC). The current common scheme works as follows:

s1(k)−s2*(k) repeat
s2(k) s1*(k) repeat
s3(k)−s4*(k) repeat
s4(k) s3*(k) repeat

Each line represents symbols transmitted on a particular antenna during two successive symbol periods. More particularly, during a first of two successive symbol periods, distinct symbols are transmitted on antennas 1 through 4. During the next successive symbol period, equivalent but transformed symbols are transmitted. Hence, the negative conjugate of the symbol that was transmitted on antenna 2 is transmitted on antenna 1, the conjugate of the symbol that was transmitted on antenna 1 is transmitted on antenna 2, etc. The indicated pattern is repeated (i.e., for antenna 1, there follows s1(k+1), (−s2*(k+1)).

Coded bits in close proximity should be separated as far apart as possible in the time domain and in the frequency domain when OFDM is applied. Although it is possible to design an interleaver that would achieve this goal, it is impossible to upgrade a system with an existing interleaver. Also, for M×1 systems where M>2, the existing repetitive scheme does not fully utilize different varieties of spatial diversity.

Figure 9:
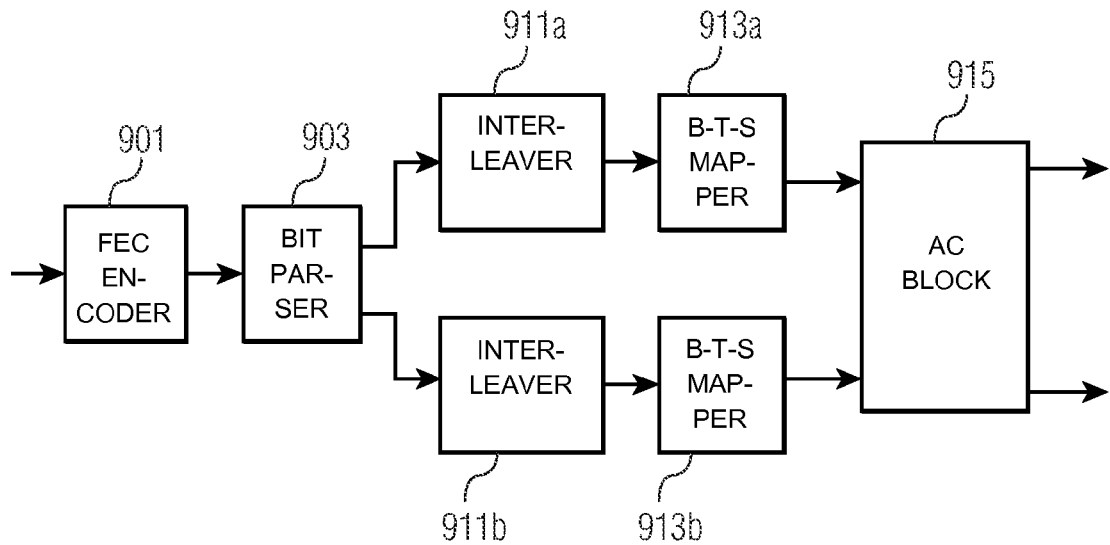
FIG. 9 is a block diagram of a portion of a communication transmitter using Alamouti coding in accordance with one aspect of the invention.

To better utilize different varieties of spatial diversity, multiple information streams are formed, which are then individually interleaved. Referring to FIG. 9, blocks 901, 903, 911a, 911b, 913a and 913b correspond generally to blocks 501, 503, 511a, 511b, 513a and 513b. An AC block 915 receives the resulting streams (individually interleaved) and performs Alamouti Coding thereon in a known manner. This arrangement may be referred to as Individually Interleaved Alamouti Coding (I2AC).

Figure 10:
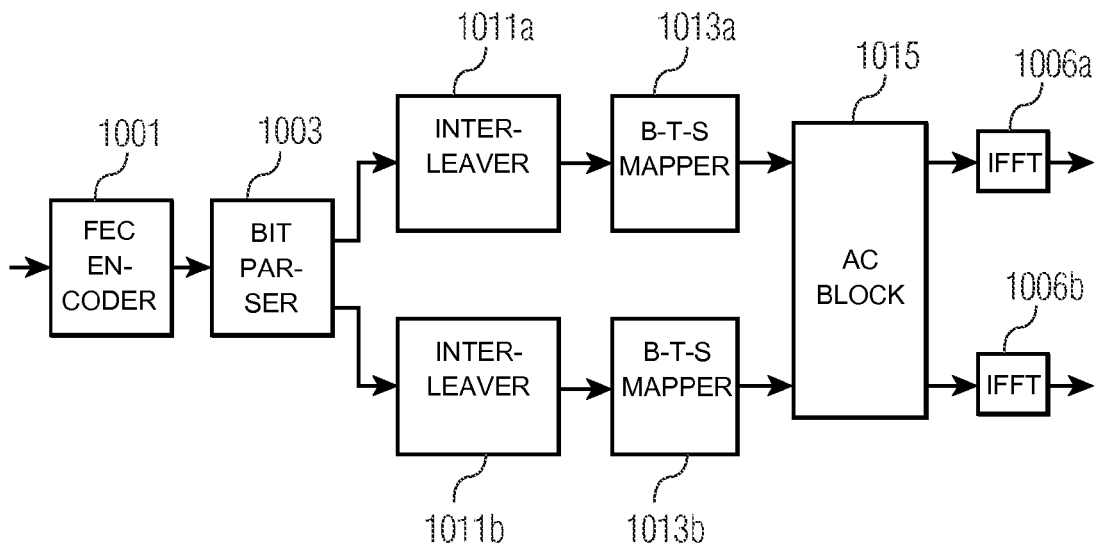
FIG. 10 is a block diagram of a portion of a communication transmitter using OFDM and Alamouti coding in accordance with one aspect of the invention.

In an OFDM system, as illustrated in FIG. 10, for each branch, an RFFT 1006 is added following the AC block.

For M>2, spatial rotation may be applied on top of I2AC. For the 4×2 case, for example, four streams will be bit parsed. Each stream is individually interleaved and mapped to QAM symbols. AC coding is then performed as follows:

s1(k)−s2*(k) s1(k+1)−s3*(k+1) s1(k+2)−s4*(k+2)
s2(k) s1*(k) s2(k+1)−s4*(k+1) s2(k+2)−s3*(k+2)
s3(k)−s4*(k) s3(k+1) s1*(k+1) s3(k+2) s2*(k+2)
s4(k) s3*(k) s4(k+1) s2*(k+1) s4(k+2) s1*(k+2)

So the streams are pair-wise STBC-ed (three pairs possible ((1,2) (3,4)), ((1,3), (2,4)), ((1,4), (2,3))) over the 4 antennae. This can be done in two ways as follows:

Option 1:
The Alamouti encoding is done over six consecutive OFDM symbols as follows: the first two OFDM symbols use the combination (1,2), (3,4) on all the frequencies, the next two OFDM symbols use the combination (1,3), (2,4) over all frequencies and the last two OFDM symbols use (1,4), (2,3) over all frequencies, and then the pattern repeats for the next six OFDM symbols. The disadvantage of doing it this way is that the channel matrix for each frequency changes with time.

Let, aij, bij, cij and dij be the jth data-symbol in the ith OFDM block and the four streams are denoted by a, b, c and d. Let each OFDM block have N data symbols. A set of symbols between square brackets [ ] is one OFDM symbol.

The operations performed by the AC block may then be represented as follows:

Input: to STBC (AC) block:
[a11 a12 . . . a1N] [a21 a22 . . . a2N] [a31 a32 . . . a3N] . . .
[b11 b12 . . . b1N] [b21 b22 . . . b2N] [b31 b32 . . . b3N] . . .
[c11 c12 . . . c1N] [c21 c22 . . . c2N] [c31 c32 . . . c3N] . . .
[d11 d12 . . . d1N] [d21 d22 . . . d2N] [d31 d32 . . . d3N].

Output of STBC block:
[a11 a12 . . . a1N] [−b11*−b12 . . . −b1N*] [a21 a22 . . . a2N] [−c21*−c22 . . . −c2N*] [a31 a32 . . . a3N] [−d31*−d32 . . . d3N*] . . .
[b11 b12 . . . b1N] [a11*a12* . . . a1N*] [b21 b22 . . . b2N] [−d21*−d22 . . . −d2N*] [b31 b32 . . . b3N] [−c31*−c32 . . . −c3N*].
[c11 c12 . . . c1N] [−d11*−d12* . . . −d1N*] [c21 c22 . . . c2N] [a21*a22* . . . a2N*] [c31 c32 . . . c3N] [b31*b32* . . . b3N*] . . .
[d11 d12 . . . d1N] [c11*c12* . . . c1N*] [d21 d22 . . . d2N] [b21*b22* . . . b2N*] [d31 d32 . . . d3N] [a31*a32* . . . a3N*].

Option 2:
The Alamouti encoding is done over two OFDM symbols as follows: the first frequency bin uses combination (1,2), (3,4), the 2nd frequency bin uses combination (1,3), (2,4), the 3rd frequency bin uses (1,4), (2,3) and the pattern repeats. Hence the Alamouti encoding uses symbols from different antennae for each frequency bin. However the channel matrix for each frequency bin does not change over time.

Input to STBC block:
[a11 a12 a13 a14 . . . a1N]
[b11 b12 b13 b14 . . . b1N]
[c11 c12 c13 c14 . . . c1N]
[d11 d12 d13 d14 . . . d1N]

Output of STBC block:
[a11 a12 a13 a14 a15 a16 . . . a1N] [−b11*−c12*−d13*−b14*−c5*−d16* . . . ]
[b11 b12 b113 b14 b15 b16 . . . b1N] [a11*−d12*−c13*a14*−d15*−c16* . . . ]
[c11 c12 c13 c14 c15 c16 . . . c1N] [−d11*a12*b13*−d14*a15*b16* . . . ]
[d11 d12 d13 d14 d15 d16 . . . d1N] [c11*b12*a13*c14*b15*a16* . . . ]

The same principles are applicable for any 2p×p STBC system.

It will be appreciated by those of ordinary skill in the art that the invention can be embodied in other specific forms without departing from the spirit or essential character thereof. The illustrated embodiments are therefore intended in all respects to be illustrative and not restrictive. The scope of the invention is indicated by the appended claims rather than the foregoing description, and all changes the come within the spirit and range of equivalents thereof are intended to be embraced therein.

What is claimed is:

1. A method of transmitting data using a number of transmit antennas greater than an expected number of receive antennas, comprising:
   forming a group of transmit antennas;
   forming from a first data stream multiple second data streams, including a second data stream for each of said antennas, successive bits in said first data stream being assigned to different ones of said second data streams;
   individually performing block interleaving of multiple respective ones of said second data streams; and
   during a particular transmission interval, performing tone interleaving with respect to said antennas such that for each tone of an OFDM symbol, that tone is non-zero for just one antenna of the group of antennas and is zero for other antennas of the group of antennas.

2. The method of claim 1, comprising performing space time block coding of said OFDM symbols prior to transmission.

3. A transmitter for transmitting data using a number of transmit antennas greater than an expected number of receive antennas, comprising:
    means for forming a group of transmit antennas;
    means for forming from a first data stream multiple second data streams, including a second data stream for each of said antennas, successive bits in said first data stream being assigned to different ones of said second data streams;
    means for individually performing block interleaving of multiple respective ones of said second data streams; and
    means for, during a particular transmission interval, performing tone interleaving with respect to said antennas such that for each tone of an OFDM symbol, that tone is non-zero for just one antenna of the group of antennas and is zero for other antennas of the group of antennas.

4. The apparatus of claim 3, comprising means for performing space time block coding of said OFDM symbols prior to transmission.

5. A method of transmitting data using a number of transmit antennas greater than an expected number of receive antennas, comprising:
    forming from a first data stream multiple second data streams, successive bits in said first data stream being assigned to different ones of said second data streams;
    individually performing block interleaving of multiple respective ones of said second data streams;
    forming symbols from respective ones of said second data streams; and
    rearranging frequency bin information of said OFDM symbols by, during successive transmission intervals, transmitting from one antenna within one frequency bin of an OFDM symbol frequency bin information taken from different ones of said second data streams followed by equivalent transformed frequency bin information.

6. The method of claim 5, further comprising encoding said first data stream.

7. The method of claim 5, wherein, for at least some of said OFDM symbols, frequency bin information for a particular OFDM symbol is taken from an even number, greater than two, of said second data streams.

8. A data transmitter wherein a number of transmit antennas greater than an expected number of receive antennas, comprising:
    means for forming at least one pair of antennas;
    means for forming from a first data stream multiple second data streams, successive bits in said first data stream being assigned to different ones of said second data streams;
    means for individually performing block interleaving of multiple respective ones of said second data streams;
    means for forming symbols from respective ones of said second data streams; and
    means for forming OFDM symbols such that, during successive transmission intervals, a pair of antennas transmits OFDM symbols taken from different ones of said second data streams followed by equivalent transformed OFDM symbols,
    wherein for each OFDM symbol, frequency bin information for that OFDM symbol is taken from a single one of said second data streams.

9. The apparatus of claim 8, further comprising means for encoding said first data stream.

* * * * *